(12) United States Patent
Mine et al.

(10) Patent No.: US 6,760,517 B2
(45) Date of Patent: Jul. 6, 2004

(54) OPTICAL COUPLING DEVICE FOR TWO-WAY OPTICAL COMMUNICATIONS

(75) Inventors: Keiji Mine, Osaka (JP); Hiroshi Nakagawa, Kyoto (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 42 days.

(21) Appl. No.: 10/302,629

(22) Filed: Nov. 21, 2002

(65) Prior Publication Data

US 2003/0108285 A1 Jun. 12, 2003

(30) Foreign Application Priority Data

Dec. 11, 2001 (JP) .......................................... 2001-377063

(51) Int. Cl.[7] .............................. G02B 6/34; G02B 6/26
(52) U.S. Cl. ........................................... 385/36; 385/47
(58) Field of Search .............................. 385/36, 47, 88, 385/89; 359/831, 833, 834, 837

(56) References Cited

U.S. PATENT DOCUMENTS 4,915,489 A * 4/1990 Minko .......................... 359/834
5,440,655 A * 8/1995 Kaplow et al. ................ 385/25

* cited by examiner

*Primary Examiner*—Rodney Bovernick
*Assistant Examiner*—Mike Stahl
(74) *Attorney, Agent, or Firm*—David N. Lathrop, Esq.; Gallagher & Lathrop (57) ABSTRACT

In a triangular-sectioned prism 11 having a first plane 11a opposite an end face of an optical fiber 12, a second plane 11b opposite a light receiving element 13 and a third plane 11c which reflects received light 21 incident thereon from the optical fiber 12 toward the second plane 11b and transmits transmission light 22 emitted from a light emitting element toward the first plane 11a, a cylindrical member 32 of a refractive index larger than that of the prism 11 is embedded in that area of the prism 11 which is opposite the end face of the optical fiber 12. The cylindrical member 32 effectively suppresses the leakage therefrom of light, providing increased optical coupling efficiency as compared with that achievable by use of a mere prism structure.

20 Claims, 7 Drawing Sheets

OPTICAL COUPLING DEVICE FOR TWO-WAY OPTICAL COMMUNICATIONS

BACKGROUND OF THE INVENTION

The present invention relates to an optical coupling device for two-way optical communications over a single optical fiber and, more particularly, to an optical coupling device disposed opposite the end face of the optical fiber, through which received light output from the optical fiber is guided to light receiving means and transmission light emitted from light emitting means is launched into the fiber end face.

Figure 1:
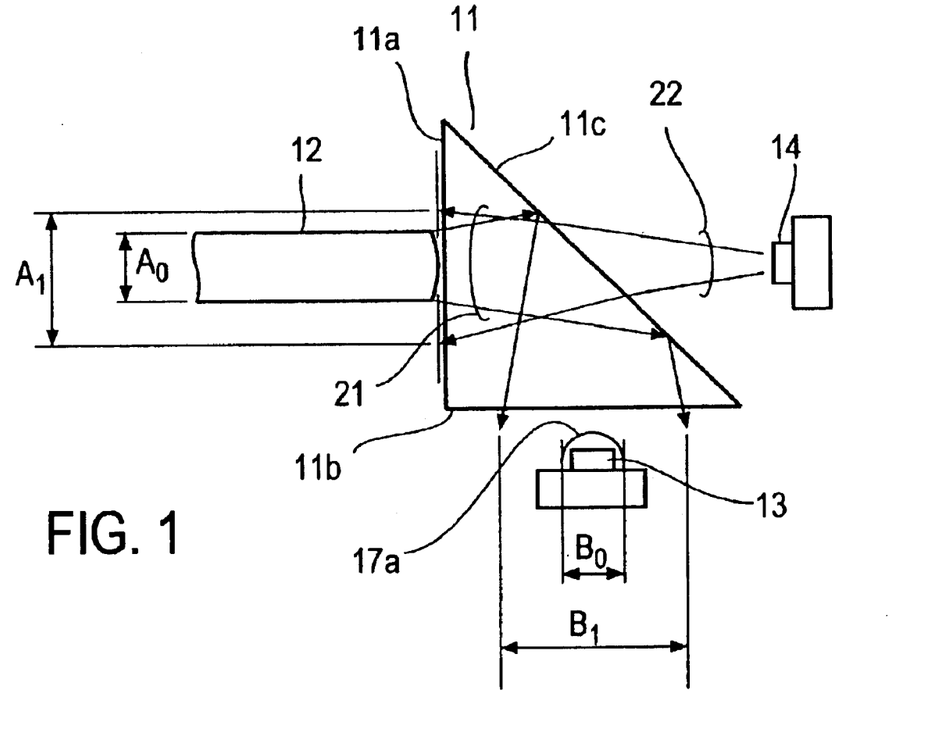
FIG. 1 is a schematic diagram for explaining transmission and reception of light which uses a typical prism.

For two-way optical communications over a single optical fiber, it is necessary to guide at either end of the fiber transmission light emitted from a light emitting element into the optical fiber and light output therefrom into a light receiving element. A general configuration of such an optical coupling device is one that optically couples the light emitting element and the light receiving element to either end face of the optical fiber through utilization of transmission and reflection of light by means of a half mirror or prism. FIG. 1 is a diagrammatic showing of an example using a prism as the optical coupling element in combination with an optical fiber 12, a light emitting element 14 and a light receiving element 13. In this example, the optical coupling device is formed by a prism 11, through which light is transmitted and received.

The prism 11 in this example is of rectangular equilateral triangle in section. The optical fiber 12 is disposed with its one end face adjacent a first one (11a) of two planes of the prism 11 which form the right angles between them, and the light receiving element 13 is disposed with its condenser lens 17a adjacent the second plane 11b of the prism 11. Disposed outside a third plane 11c of the prism 11 which forms an oblique side is the light emitting element 14.

With such an arrangement, received light 21 output from the end face of the optical fiber 12 is launched into the prism 11 through the plane 11a, then reflected by the plane 11c to the plane 11b, and launched therefrom into the light receiving element 13. On the other hand, transmission light 22 emitted from the light emitting element 14 enters the prism 11 through the plane 11c, that is, it passes through the plane 11c to the plane 11a, thereafter being launched into the end face of the optical fiber 12.

The use of the prism 11 as described above permits favorable positioning of light emitting means (light emitting element 14) for launching the transmission light 22 into the optical fiber 12 and light receiving means (light receiving element 13) for receiving the received light output from the optical fiber 12.

With the FIG. 1 configuration, letting the diameter of the optical fiber 12 be represented by $A_0$ and the spread diameter of the transmission light 22 on the end face of the optical fiber 12 be represented by $A_1$, the quantity of transmission light 22 to be launched into the optical fiber 12 bears a relationship, $A_0^2/A_1^2$, to the quantity of transmission light 22 having entered the prism 11 through the plane 11c and passed through the prism 11—this suggests a considerably low coupling efficiency.

On the other hand, letting the diameter of the condenser lens 17a be represented by $B_0$ and the spread diameter of the received 21 at the position of the condenser lens 17a be represented by $B_1$, the quantity of received light 21 incident on the condenser lens 17a bears a relationship, $B_0^2/B_0^2$, to the quantity of received light 21 reflected by the plane 11c of the prism 11, which suggests a low coupling efficiency at the receiving side, too, as is the case with the transmitting side. The problem of low coupling efficiency still remains unsolved as well in the case of using the prism 11 coated over the entire area of its oblique plane 11c with a polarization reflecting film to form a polarization beam splitter.

The coupling efficiency could be increased, for example, by the placement of a condenser lens between the end face of the optical fiber and the prism 11, but the introduction of such an optical system separate of the prism 11 inevitably gives rise to a problem that the device becomes bulky and expensive accordingly.

SUMMARY OF THE INVENTION

It is therefore an object of the present invention to provide an optical coupling device for two-way optical communications which is small and inexpensive.

According to the present invention, the optical coupling device for two-way optical communications over a signal optical fiber, comprising:

a prism having a first plane containing an area opposite the end face of said optical fiber, a second plane containing an area opposite light receiving means and a third plane containing an area opposite light emitting means; and a cylindrical member embedded in said prism in that area of said first plane opposite the end face of said optical fiber and having a refractive index larger than that of said prism;

wherein received light launched into said prism from said optical fiber is output to said light receiving element via said cylindrical member, and transmission light launched into said prism from said light emitting element is output to said optical fiber via said cylindrical member.

DETAILED DESCRIPTION OF THE PREFERRED EMBODIMENTS

Figure 2A:
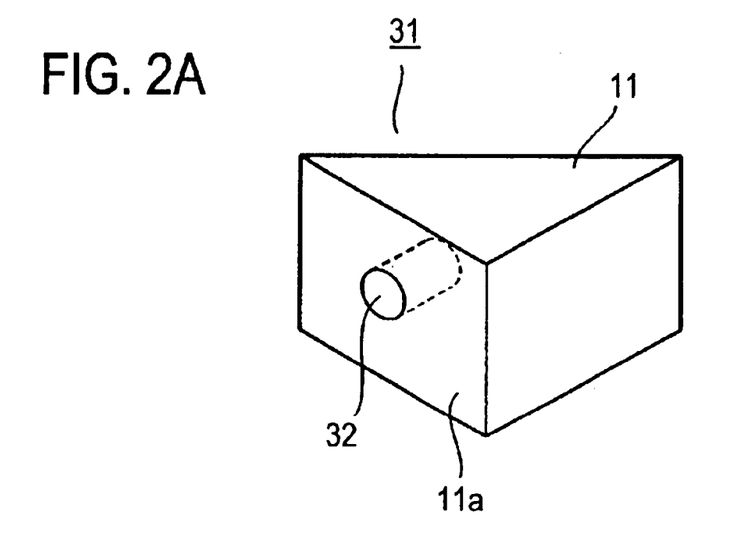
FIG. 2A is a perspective view schematically illustrating an embodiment of the optical coupling device according to the present invention.
Figure 2B:
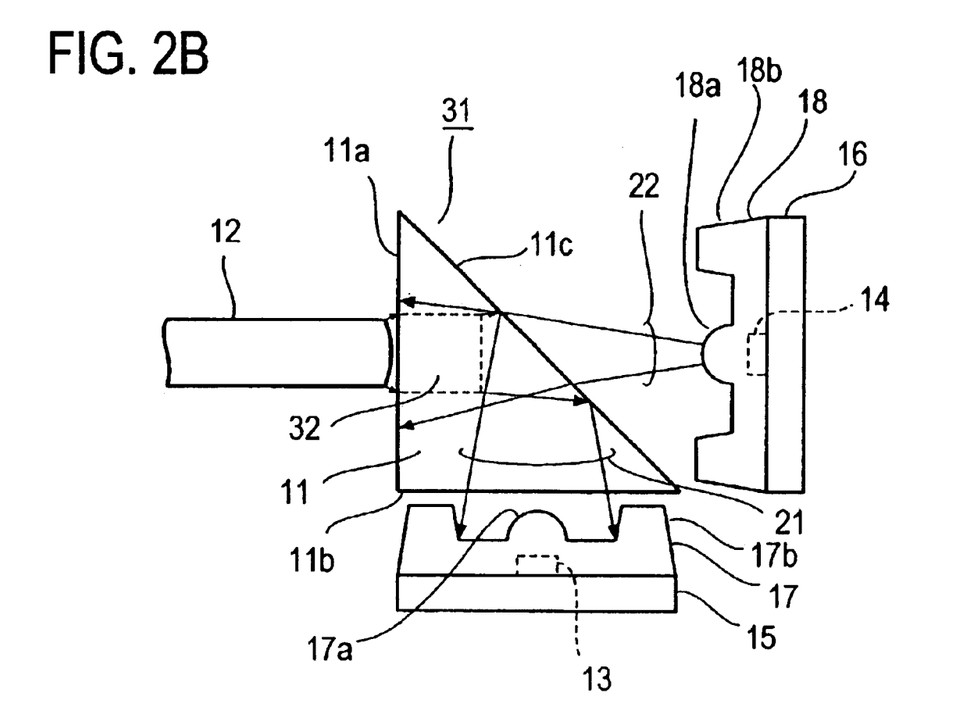
FIG. 2B is a schematic diagram for explaining the positional relationship of the optical coupling device of FIG. 2A to the light receiving element and the light emitting element.

FIG. 2A illustrates an embodiment of the optical coupling device according to the present invention, and FIG. 2B shows the optical coupling device along with an optical fiber, a light emitting element and a light receiving element. The parts corresponding to those in FIG. 1 are identified by the same reference numerals as in FIG. 1, and no detailed description will be repeated about them.

In this example the optical coupling device 31, indicated generally by 31, has embedded therein a cylindrical member 32 in that area of the first plane 11a of the rectangular-equilateral-triangle-sectioned prism 11 which is opposite the end face of the optical fiber 12 (FIG. 2B). The cylindrical member 32 is held with its axis at right angles to the first plane 11a and has a refractive index a little larger than that of the prism 11. The diameter of the cylindrical member 32 is nearly equal to the diameter $A_0$ of the optical fiber 12. The cylindrical member 32 has its one end face flush with the first plane 11a of the prism 11 and has its other end positioned near the oblique plane 11c of the prism 11.

The light receiving element 13 and the light emitting element 14 in this example are both mounted on lead frames 15 and 16 and sealed thereto by transparent sealing resins 17 and 18, respectively. Reference numerals 17a and 18a denote lens portions protrusively provided on the sealing resins 17 and 18, and 17b and 18b denote flanges formed around the lens portions 17a and 18a to protect them.

The light emitting element 14 is, for example, a laser diode (LD) or light emitting diode (LED), and the light receiving element 13 is, for example, a photodiode (PD).

Figure 3A:
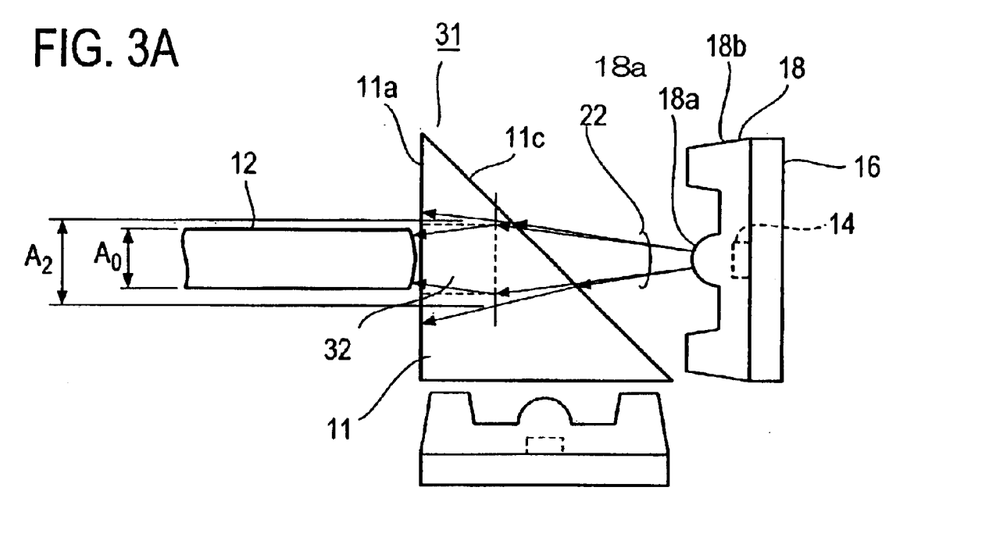
FIG. 3A is a schematic diagram for explaining in detail an optical path of transmission light in FIG. 2B.

FIG. 3A schematically depicts how the transmission light 22 emitted from the light emitting element 14 is launched into the end face of the optical fiber 12 through the optical coupling device 31 in the configuration of FIG. 2B. The transmission light 22 having impinged on the first plane 11a of the prism 11 and then entered the cylindrical member 32 does not easily leak out therefrom based on the same principle as in the case of the optical fiber. That is, the cylindrical member 32 of a large refractive index effectively suppresses the leakage therefrom of the transmission light 22 into the prism 11 of the smaller refractive index.

Accordingly, letting the diameter of the optical fiber (nearly equal to the diameter of the cylindrical member 32) be represented by $A_0$ and the spread diameter of the transmission light 22 on the inner end face of the cylindrical member 32 be represented by $A_2$, the quantity of transmission light launched into the optical fiber 12 bears a relationship, $A_0^2/A_2^2$, to the quantity of transmission light 22 having entered the cylindrical member 32 through the third plane 11c of the prism 11. In this instance, since the spread diameter $A_2$ is smaller than that $A_1$ in the FIG. 1 example, the quantity of transmission light 22 that can be launched into the optical fiber is larger than in the FIG. 1 example.

Figure 3B:
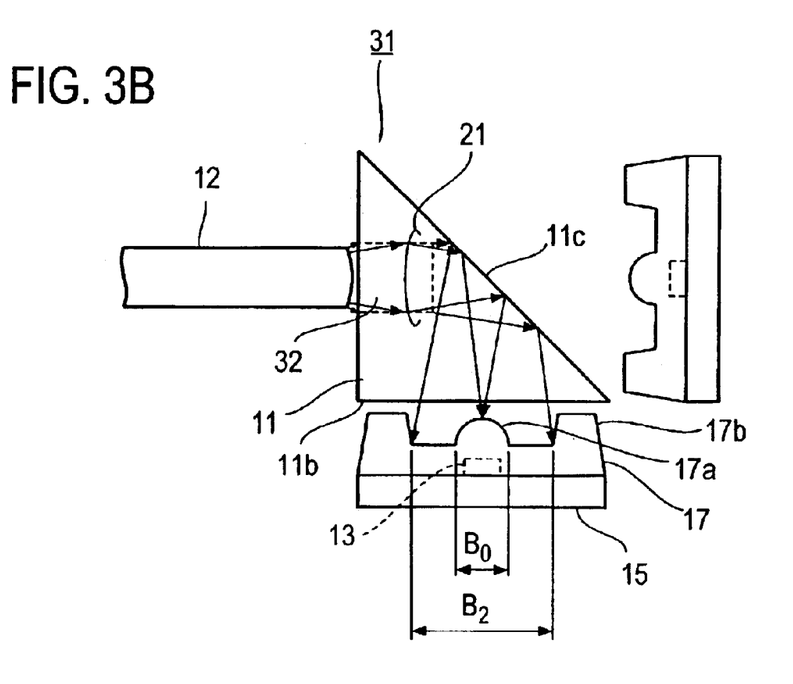
FIG. 3B is a schematic diagram for explaining in detail an optical path of received light in FIG. 2B.

FIG. 3B schematically depicts how the received light 21 output from the end face of the optical fiber 12 is launched into the light receiving element 13 via the optical coupling device 31. In this case, too, the received light 21 having entered the cylindrical member 32 is output therefrom with a small leakage for the same reasons as given above, then reflected by the plane 11c, and output from the plane 11b. That is, the cylindrical member 32 brings about the same effect as would be obtainable when the distance between the end face of the optical fiber 32 and the light receiving element 13 is diminished by the length of the cylindrical member 32.

Accordingly, letting the diameter of the lens portion 17a be represented by $B_0$ and the spread diameter of the received light 21 at the position of the lens portion 17a be represented by $B_2$, the quantity of received light 21 incident to the lens portion 17a bears a relationship, $B_0^2/B_2^2$, to the quantity of received light 21 reflected by the plane 11c of the prism 11. Since the spread diameter $B_2$ is smaller than that $B_1$ in FIG. 1, a larger quantity of received light 21 can be fed to the light receiving element 13. Hence, the use of such an optical coupling device 31 provides increased light coupling efficiency at both of the receiving and the transmitting side.

The optical coupling device 31 of such a configuration as mentioned above is fabricated, for example, by drilling a hole in the prism 11 and embedding the cylindrical member 32 into the hole. The materials for the prism 11 and the cylindrical member 32 are not limited specifically to glass but may also be resins of high transparency, in which case the optical coupling device 31 can be made by two color molding.

Instead of making and embedding the cylindrical member 32 of a larger refractive index than that of the prism 11, it is also possible to cut, for example, commercially available plastic fiber into a required size and embed it into the prism 11.

Figure 4A:
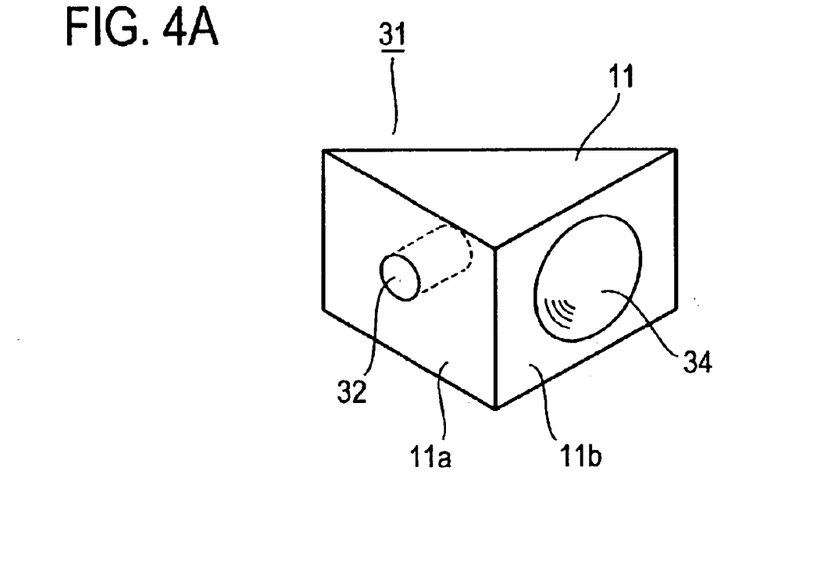
FIG. 4A is a perspective view schematically illustrating another embodiment of the optical coupling device according to the present invention.
Figure 4B:
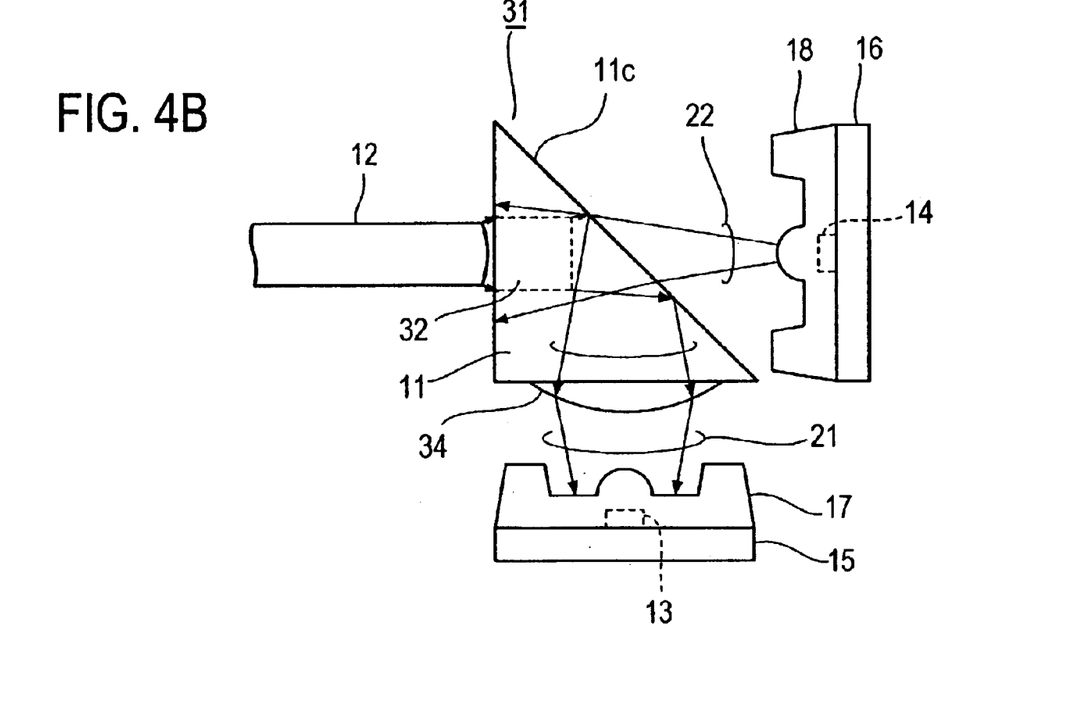
FIG. 4B is a schematic diagram for explaining transmission and reception of light by use of the optical coupling device of FIG. 4A.

FIG. 4A illustrates a device configuration which provides enhanced coupling efficiency at the receiving side as compared with the optical coupling device 31 described above in respect of FIG. 2A. In the optical coupling device 31 in FIG. 4B showing an example of its actual use, a condenser lens 34 is integrally formed with the prism 11 on its second plane 11b opposite the light receiving element 13.

With the provision of such a condenser lens 34, the quantity of received light 21 that is input to the light receiving element 13 becomes larger than in the case of the optical coupling device 31 shown in FIG. 2A.

Figure 5A:
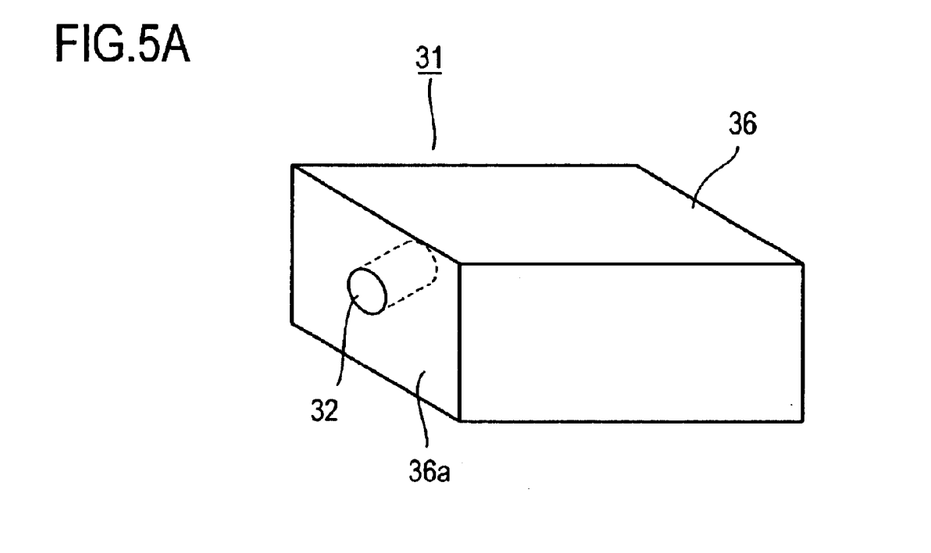
FIG. 5A is a perspective view schematically illustrating another embodiment of the optical coupling device according to the present invention.
Figure 5B:
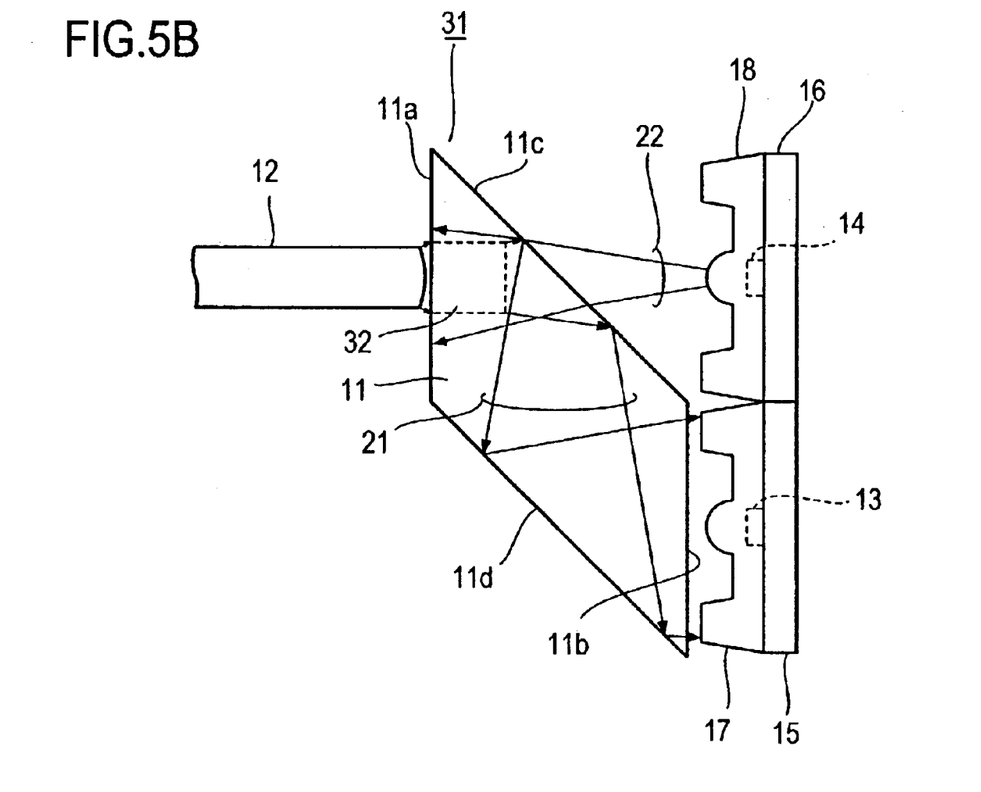
FIG. 5B is a schematic diagram for explaining transmission and reception of light by use of the optical coupling device of FIG. 5A.

FIG. 5A illustrates the configuration of the optical coupling device 31 which is used when the light receiving element 13 and the light emitting element 14 are placed in the same plane as depicted in FIG. 5B. The optical coupling device 31 of this example has the cylindrical member 32 embedded in the prism 11 of parallelogramatical section whose acute angle is 45°. In this case, too, the refractive index of the cylindrical member 32 is a little larger than that of the prism 11 as is the case with the optical coupling device depicted in FIG. 2A.

The cylindrical member 32 is embedded in that area of the first plane 11a of the prism 11 which is opposite the end face of the optical fiber 12, the first plane 11a forming the acute angle between it and the third plane 11c. The light receiving element 13 is disposed opposite the second plane 11b parallel to the first plane 11a. Positioned outside the third plane 11c is the light emitting element 14 arranged in a pane parallel to that of the light receiving element 13, in this example, in the same plane as that of the latter.

The received light 21 output from the end face of the optical fiber 12 enters the prism 11 and is reflected by the plane 11c, and the reflected received light 21 is further reflected by a fourth plane 11d opposite the plane 11c to the plane 11b, thereafter being fed to the light receiving element 13. On the other hand, the transmission light 22 emitted from the light emitting element 14 enters the prism 11 through the plane 11c, from which it is launched into the end face of the optical fiber 12.

In this example, too, since the cylindrical member 32 larger in refractive index than the prism 11 is embedded therein in opposing relation to the end face of the optical fiber 12, the optical coupling efficiency increases at either of the receiving and transmitting sides as compared with the coupling efficiency achievable with the device configuration using a mere prism without the cylindrical member 32.

Incidentally, this example improves the optical coupling efficiency at the transmitting side as in the case of the optical coupling device 31 shown in FIG. 2A, but at the receiving side, an increase in the optical path length from the inner end face of the cylindrical member 32 to the light receiving element 13 allows the received light 21 to diverge or spread, causing a decrease in the quantity of received light accordingly. This disadvantage can be overcome by such a device configuration as shown in FIG. 6.

Figure 6:
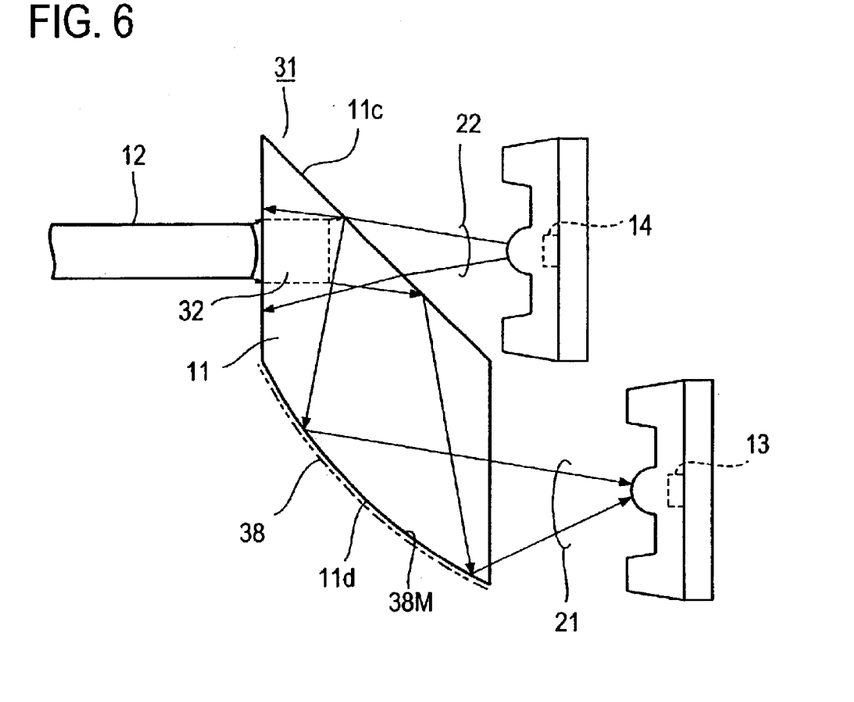
FIG. 6 is a schematic diagram illustrating still another embodiment of the optical coupling device according to the present invention and explanatory of transmission and reception of light by use of the illustrated embodiment.

The optical coupling device 31 of FIG. 6 is a modified form of the FIG. 5A example, in which the fourth plane 11d of the prism 11 is made spherical and a reflecting film 38 is coated all over the spherical surface to form a total reflecting concave mirror 38M over the entire area of the interior surface of the prism 11. With such a spherical configuration of the plane 11d of the prism 11, it is possible to concentrate the received light 21 onto the light receiving element 13 as depicted in FIG. 6, sharply improving the optical coupling efficiency.

The reflecting film 38 is formed by evaporating, for instance, aluminum (Al), onto the plane 11d, and a dielectric mirror structure can also be used.

Incidentally, the surface configuration of the plane 11d need not always be spherical but may also be aspheric, and it is also possible to use a structure without the total reflecting mirror, for instance.

In the optical coupling device 31 of FIG. 6, since it is difficult to decrease the focal length of the concave mirror 38M, the placement of the light receiving element 13 at the spot of convergence of the received light 21 by the plane 11d results in an increase in the distance of the light receiving element 13 to the optical coupling device 31. This problem can be solved by such an optical coupling device 31 as shown in FIG. 7, in which a condenser lens 40 is formed integrally with the plane 11b of the prism 11 which is opposite the light receiving element 13.

Figure 7:
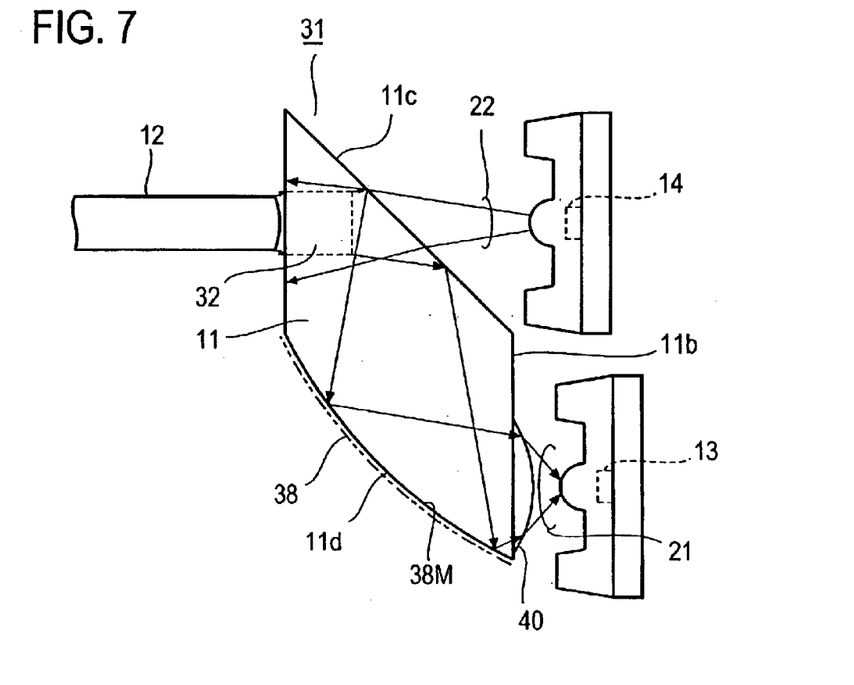
FIG. 7 is a schematic diagram depicting an optical coupling device 31 (FIG. 6) having formed integrally therewith a condenser lens and explanatory of transmission and reception of light by use of the optical coupling device 31.

With the provision of such a condenser lens 40, the light receiving element 13 can be placed near the optical coupling device 31 as depicted in FIG. 7.

Figure 8:
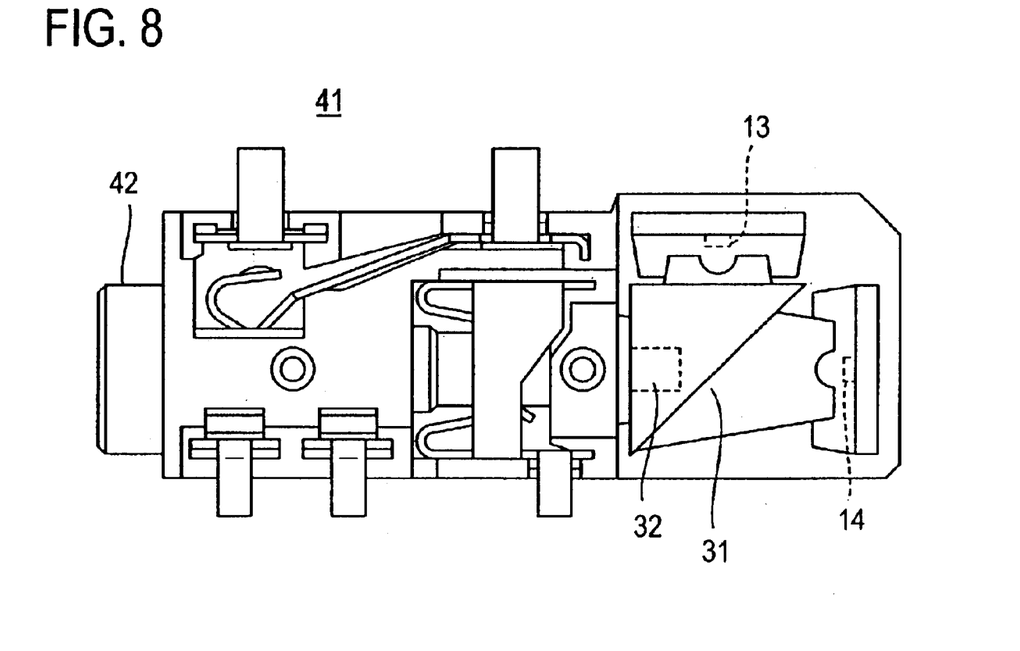
FIG. 8 is a bottom view of an optical fiber connector having incorporated therein the optical coupling device 31 of FIG. 2A.

FIG. 8 shows, as an example of the usage of the optical coupling device 31 according to the present invention, the state in which it is mounted on a single optical fiber connector 41 for photoelectric conversion use. In this example, the optical coupling device 31 shown in FIG. 2A is built in the connector 41. Reference numeral 42 denotes a sleeve in which an optical fiber plug is inserted.

As depicted in FIG. 8, the optical device 31 is high-efficiency and small, and hence it is suitable for use in such an optical fiber connector 41.

While in FIG. 2A the sectional configuration of the prism 11 in which the cylindrical member 32 of the optical coupling device 31 is embedded has been described to be a rectangular bilateral triangle and in FIG. 5A the sectional configuration of the prism 11 has been described to be a parallelogram having an acute angle of 45°, the sectional configurations of the prism 11 is not limited specifically to them, and can be properly chosen according to usage.

Figure 9:
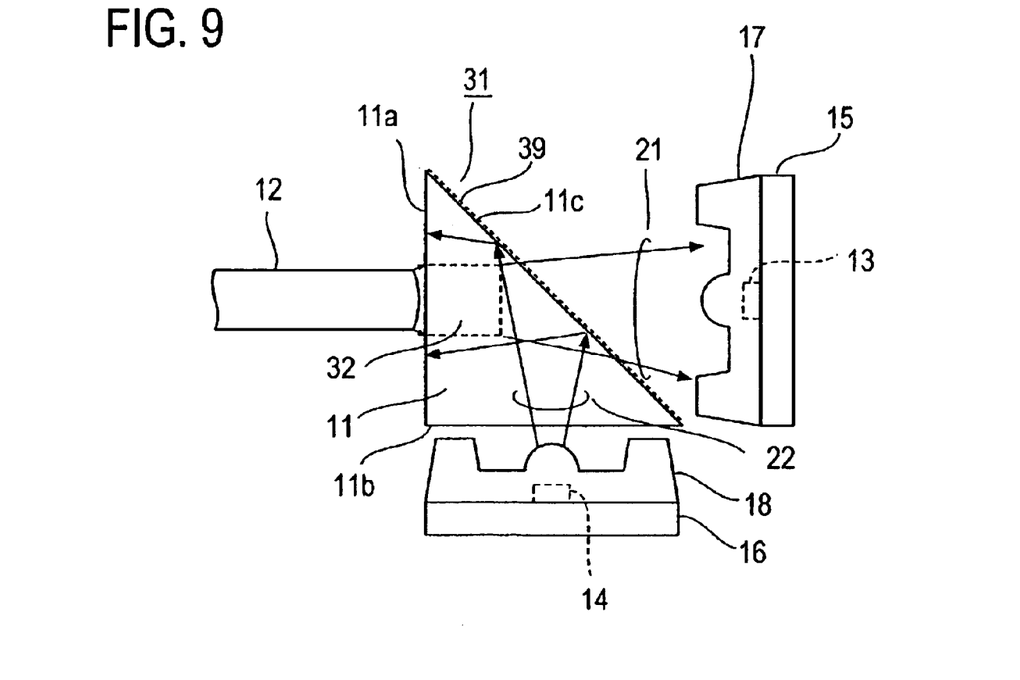
FIG. 9 is a schematic diagram showing a modification of the FIG. 2B embodiment in which the light receiving element and the light emitting element are interchanged.

Further, in the embodiments described above the received light 21 incident to the prism 11 from the optical fiber 12 passes through the cylindrical member 32 and is reflected by the plane 11c of the prism 11 toward the light receiving element 13 and the transmission light 22 emitted from the light emitting element 14 is launched into the optical fiber 12 after passage through the cylindrical member without a change of the optical path by reflection in the prism 11. As shown in FIG. 9 corresponding to FIG. 2, however, the light receiving element 13 and the light emitting element 14 can also be interchanged so that the received light 21 is caused to pass through the cylindrical member 32 and output from the plane 11c to the light receiving element 13 and that the transmission light 22 emitted from the light emitting element 14 is reflected by the plane 11c to pass through the cylindrical member 32 and then launched into the optical fiber 12. It is evident that such a configuration is applicable to the embodiments of FIGS. 4, 5A, 5B, 6 and 7 as well.

Moreover, in the embodiments described above, as shown in FIG. 9, it is possible to coat a polarization reflecting film 39 all over the plane 11c of the prism 11 to form a polarization beam splitter which isolates p-polarized light and s-polarized light.

EFFECT OF THE INVENTION

As described above, according to the present invention, a prism which guides received light output from an optical fiber to light receiving means and launches transmission light from light emitting means into the end face of the optical fiber has embedded therein a cylindrical member in that area of the prism which is opposite the end face of the optical fiber, the cylindrical member having a refraction index larger than that of the prism. The difference in refractive index between the prism and the cylindrical member serves to prevent light from leaking out of the latter and hence suppress the divergence of light, providing increased coupling efficiency for both of transmission light and received light. As compared a mere prism structure, such a compound prism structure according to the present invention improves the utilization efficiency of light without the need for larger structure, and an optical system for increasing the coupling efficiency need not be provided separately of the prism. Accordingly, the present invention offers a high-efficiency, small and low-cost optical coupling device for two-way optical communications.

What is claimed is:

1. An optical coupling device for two-way optical communications over a single optical fiber, said device comprising:

a prism having a first plane containing an area opposite an end face of said optical fiber, a second plane containing an area opposite light receiving means and a third plane containing an area opposite light emitting means; and a cylindrical member embedded in said prism in that area of said first plane opposite the end face of said optical fiber, said cylindrical member having a refractive index larger than that of said prism;

wherein received light incident to said prism from said optical fiber is guided through said cylindrical element and output to said light receiving element, and transmission light incident to said prism from said light emitting element is guided through said cylindrical member and launched into said optical fiber.

2. The device of claim 1, wherein a section passing through said first, second and third planes is a rectangular equilateral triangle, said first plane containing one of two sides of said rectangular equilateral triangle which are perpendicular to each other.

3. The device of claim 2, wherein a plane containing the other of said two side perpendicular to each other is said second plane and a plane containing an oblique side of said rectangular equilateral triangle is said third plane.

4. The device of claim 3, further comprising a condenser lens formed in that area of said second plane opposite said light receiving means.

5. The device of claim 1, wherein said prism is a prism of substantially a parallelogramatical section which has a fourth plane adjoining said first plane with an obtuse angle between said fourth and first planes.

6. The device of claim 5, wherein said first and third plane form an acute angle between them so that said transmission light incident to said third plane of said prism from said light emitting means is guided through said cylindrical member and launched into said optical fiber and that said received light incident to said first plane of said prism from said optical fiber is guided through said cylindrical member and reflected first by said third plane and then by said fourth plane and output to said light receiving means from said fourth plane.

7. The device of claim 6, wherein said fourth plane forms a spherical or aspherical concave plane on the interior surface of said prism.

8. The device of claim 7, further comprising a reflecting film formed all over the exterior surface of said fourth plane of said prism.

9. The device of claim 5, further comprising a condenser lens formed integrally with said second plane of said prism.

10. The device of claim 6, further comprising a condenser lens formed integrally with said second plane of said prism.

11. The device of claim 7, further comprising a condenser lens formed integrally with said second plane of said prism.

12. The device of claim 8, further comprising a condenser lens formed integrally with said second plane of said prism.

13. The device of claim 1, further comprising a polarization reflecting film formed all over said third plane of said prism.

14. The device of claim 2, further comprising a polarization reflecting film formed all over said third plane of said prism.

15. The device of claim 3, further comprising a polarization reflecting film formed all over said third plane of said prism.

16. The device of claim 4, further comprising a polarization reflecting film formed all over said third plane of said prism.

17. The device of claim 5, further comprising a polarization reflecting film formed all over said third plane of said prism.

18. The device of claim 6, further comprising a polarization reflecting film formed all over said third plane of said prism.

19. The device of claim 7, further comprising a polarization reflecting film formed all over said third plane of said prism.

20. The device of claim 8, further comprising a polarization reflecting film formed all over said third plane of said prism.

* * * * *